United States Patent
Kao et al.

(10) Patent No.: US 6,376,624 B1
(45) Date of Patent: Apr. 23, 2002

(54) COMPOSITIONS BASED ON HIGH MOLECULAR WEIGHT POLYESTERS AND METHODS FOR MAKING THE SAME

(75) Inventors: Hsin-Ching Kao; Lee-Hua Chen; Chi-Lang Wu; Jinn-Jong Wong; Szu-Yuan Chan; Sheng-Te Yang, all of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/544,568

(22) Filed: Apr. 6, 2000

(30) Foreign Application Priority Data

Dec. 27, 1999 (TW) ........................................ 88122991 A

(51) Int. Cl.$^7$ .............................................. C08G 63/91
(52) U.S. Cl. ..................... 525/438; 525/446; 525/440; 525/442; 528/297
(58) Field of Search ................................. 525/438, 446; 528/297

(56) References Cited

U.S. PATENT DOCUMENTS 4,101,601 A * 7/1978 Thomas ...................... 525/438

* cited by examiner

Primary Examiner—Patricia A. Short
(74) Attorney, Agent, or Firm—Sughrue Mion, PLLC

(57) ABSTRACT

Compositions based on high viscosity, high molecular weight polyesters are prepared by heating a molten mixture of: (A) a prepolymer of a polyester resin; and (B) 0.05–10 wt %, based one the weight of the polyester prepolymer, of a multifunctional polymeric chain extender having functional groups selected from the group consisting of epoxy and isocyanate.

7 Claims, No Drawings

COMPOSITIONS BASED ON HIGH MOLECULAR WEIGHT POLYESTERS AND METHODS FOR MAKING THE SAME

BACKGROUND OF THE INVENTION

1. Field of the Invention

The present invention relates in general to polyester compositions. More particularly, it relates to compositions based on high molecular weight polyesters and methods for making the same.

2. Description of the Related Arts

High molecular weight polyesters (polyesters having high intrinsic viscosity) are required for a variety of industrial uses. Such polyesters are commonly produced from low molecular weight polyesters of the same composition by solid state polymerization. However, the production is time- and energy-consuming and necessitates a marked increase in manufacturing costs. Solid state polymerization also has limitations. For example, an increase of viscosity of amorphous polyethylene terephthalate (APET), which is commonly used as a transparent packaging material, cannot be obtained by solid state polymerization, because the pellets of APET tend to agglomerate when the temperature is higher than the Tg point.

It is also known that an increase in viscosity of polyesters can be obtained during processing by reactions with a variety of low-molecular-weight chain extenders such as bis-2-oxazoline disclosed in Japanese Patent Application Laid-Open No. 62-1017. However, the reactions with these chain extenders do not have satisfactory efficiencies. It has been found by the inventors of the present invention that these low-molecular-weight chain extenders tend to decompose or evaporate during the process because a temperature of higher than 260° C. is generally required to melt the polyesters. Therefore, better methods for making high molecular weight polyesters are desired.

SUMMARY OF THE INVENTION

It is an object of the invention to solve the above-mentioned problems and provide polyester compositions based on high molecular weight polyesters and methods for making the same.

To attain the above object, the present invention is characterized by employing a multifunctional polymeric chain extender to react with hydroxy or carboxylic terminal groups of a polyester prepolymer to increase the viscosity efficiently. The polymeric chain extender is non-volatile and thermally stable, so a high efficiency chain extending reaction can be achieved. In accordance with the present invention, polyesters with sufficiently high viscosity can be obtained within a few minutes after addition of the chain extenders. Furthermore, an increase of viscosity of APET can be achieved by the present invention.

According to the present invention, a composition based on a high molecular weight polyester having an intrinsic viscosity of at least 0.7 is prepared by heating a molten mixture of: (A) a prepolymer of a polyester resin having an intrinsic viscosity of at least 0.3; and (B) 0.05–10 wt %, based on the weight of the polyester prepolymer, of a multifunctional polymeric chain extender having functional groups selected from the group consisting of epoxy and isocyanate.

The present method for making a composition based on a high molecular weight polyester having an intrinsic viscosity of at least 0.7 comprises heating at 270° to 290° C. a molten mixture of: (A) a prepolymer of a polyester resin having an intrinsic viscosity of at least 0.3; and (B) 0.05–10 wt %, based on the weight of the polyester prepolymer, of a multifunctional polymeric chain extender having functional groups selected from the group consisting of epoxy and isocyanate.

DETAILED DESCRIPTION OF THE INVENTION

The polyesters resins useful in the present invention include those thermoplastic polyester resins which can be readily extruded to form monofilaments, fibers, films or molded articles. Such polyesters are derived from an aromatic diacid and a glycol. Examples of suitable aromatic diacids include terephthalic, isophthalic and naphthalaic dicarboxylic acid, or combinations thereof. Examples of suitable glycols include alkane diols of 2–10 carbon atoms such as ethylene glycol, butylene glycol, diethylene glycol, 1,3-propanediol, dimethyl-1,3-propanediol, cyclohexanediol, 2-ethyl-2-butyl-1,3-propanediol, or combinations thereof.

Examples of suitable polyesters include polyethylene terephthalate (PET), polybutylene terephthalate (PBT), polyethylene naphthalate (PEN), copolymers of PET, copolymers of PBT and copolymers of PEN. A preferred polyester resin is PET.

The polyesters and copolyesters can be produced using conventional polyesterification procedures which are well known in the art. They can be formed by direct esterification of the acid, or by ester exchange with the esters of the acids, and followed by polycondensation. For example, PET may be formed from ethylene glycol by direct esterification with terephthalic acid, or by ester exchange between ethylene glycol and dimethyl terephthalate, and followed by polycondensation.

The chain extenders useful in the present invention are polymeric chain extenders having two or more functional groups selected from the group consisting of epoxy and isocyanate. Exemplary polymeric chain extenders include polymethylene phenylene isocyanate (PMPI); Novolac type epoxy resin of general formula (I),

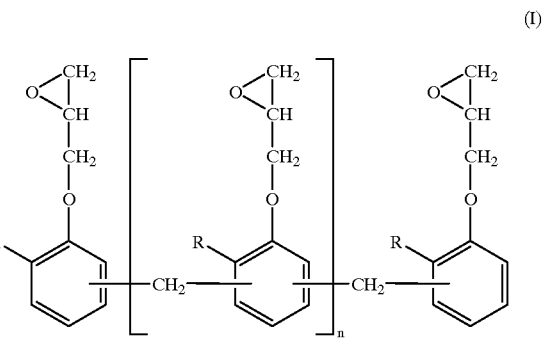

(I)

wherein R is hydrogen or methyl, and n is an integer from 1 to 10; and amine type epoxy resin of general formula (II),

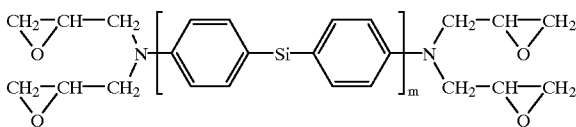

(II)

wherein m is an integer from 1 to 10.

The weight average molecular weight of the polymeric chain extender may range from about 500 to about 10,000, and preferably from about 800 to about 5,000. The polymeric *chain extender is added in an amount of about 0.05–10 wt %, based on the weight of the polyester prepolymer. Preferably, the polymeric chain extender is about 0.1–5 wt %.

Other conventional additives for polyester resins can be present in the composition of the invention. Such additives include stabilizers and inhibitors of oxidative, thermal, and ultraviolet light degradation; lubricants; colorants including dyes and pigments; particulate fillers; flame retardants; nucleating agents, etc.

In the process of the invention, the polymeric chain extender is blended with a prepolymer of a polyester resin to proceed the chain extending reaction. The blending is carried out at a temperature ranging from about 270° to 290° C., and preferably from about 280° to 290° C. In general, a viscosity of higher than 0.7 can be reached within about 1 to 3 minutes after addition of the chain extender. In comparison, the conventional solid state polymerization requires at least 10 hours to reach the same extent. Thus, the present invention can reduce manufacturing cost and increase throughput.

The blending of the polyester prepolymer and the polymeric chain extender can be accomplished by a variety of methods which are well-known in the art. In general, the blending can be accomplished by melt blending in a closed system. For example, this can be carried out in a single or multi-screw extruder, a Banbury mill, or a kneader at a temperature sufficient to cause the polyester blend to melt flow. Alternatively, the polymeric chain extender can be added to the prepolymer immediately after polycondensation of the polyester by injecting the polymeric chain extender into the polyester melt stream with appropriate mixing.

The above blending can be pelletized by using an extruder, or directly extruded to form monofilaments, fibers, films or molded articles. It is well known in the art to form polyester monofilaments by extruding polymer melt through a monofilament dye. The extruded material is then quenched, taken up and drawn. It is well known in the art to form polyester fiber by melt spinning. In general, molten polymer is fed vertically to a spinneret, drawn down and quenched with air, and converged to form a multifilament fiber. Similarly, it is well known in the art to form a polyester film by melt extrusion with various degrees of uniaxial or biaxial orientation. It is also well know in the art to form polyester parts and containers by molding. Such processes include casting, pressure molding, injection molding, extrusion molding, injection-stretch blow molding and extrusion blow molding.

The polyester articles made according to the present invention exhibit improved thermal stability as well as hydrolytic stability, compared to articles made from unmodified polyester. The improvement of hydrolytic stability is because the polymeric chain extender used herein can also end-cap the terminal residues of the polyester.

Without intending to limit it in any manner, the present invention will be further illustrated by the following examples.

EXAMPLES 1–3

A PET prepolymer of 0.60 intrinsic viscosity was dried at 130° C. in a vacuum oven for 6 hours. The prepolymer was mixed with 0.5 wt %, based on the weight of the prepolymer, of the pre-dried chain extender listed in Table 1, and fed into a twin-screw extruder to proceed a chain-extending reaction at conditions of 150 rpm and 280° C. for 3 minutes. The polyester blend was extruded to form pellets. An intrinsic viscosity measurement was run on the polyester pellets. The results are shown in Table 1.

COMPARATIVE EXAMPLE

The same procedure as in the Examples 1–3 was repeated, except without adding the chain extender.

TABLE 1

|  | Example 1 | Example 2 | Example 3 | Comparative Example |
|---|---|---|---|---|
| Chain extender | Novolac type epoxy resin | Amine type epoxy resin | PMPI | None |
| Intrinsic viscosity | 0.86 | 0.90 | 0.90 | 0.60 |

As shown in Table 1, the viscosity of the polyester was dramatically increased to 0.86 and 0.90 after a 3-minutes reaction.

While the invention has been particularly shown and described with reference to the preferred embodiment thereof, it will be understood by those skilled in the art that various changes in form and details may be made without departing from the spirit and scope of the invention.

What is claimed is:

1. A composition based on a high molecular weight polyester having an intrinsic viscosity of at least 0.7, prepared by heating a molten mixture of:
   (A) a prepolymer of a polyester resin having an intrinsic viscosity of at least 0.3; and
   (B) 0.05–10 wt %, based on the weight of the polyester prepolymer, of a multifunctional chain extender,
wherein said chain extender is an amine type epoxy resin of general formula (II):

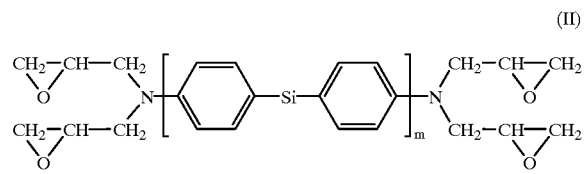

(II)

wherein m is an integer from 1 to 10.

2. The composition as claimed in claim 1, wherein said polyester prepolymer is derived from an aromatic diacid and a glycol.

3. The composition as claimed in claim 1, wherein said polyester prepolymer is a prepolymer of polyethylene terephthalate.

4. A method for making a polyester composition based on a high molecular weight polyester having an intrinsic viscosity of at least 0.7, which comprises heating at 270° to 290° C. a molten mixture of:

(A) a prepolymer of a polyester resin having an intrinsic viscosity of at least 0.3; and
(B) 0.05–10 wt %, based on the weight of the polyester prepolymer, of a multifunctional chain extender,
wherein said chain extender is an amine type epoxy resin of general formula (II):

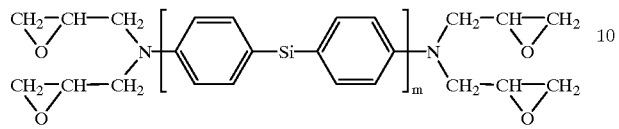

(II)

wherein m is an integer from 1 to 10.

5. The method as claimed in claim 4, wherein said heating is continued for about 1 to 3 minutes.

6. The method as claimed in claim 4, wherein said polyester prepolymer is derived from an aromatic diacid and a glycol.

7. The method as claimed in claim 4, wherein said polyester prepolymer is a prepolymer of polyethylene terephthalate.

* * * * *